United States Patent Office 3,119,790
Patented Jan. 28, 1964

3,119,790
POLYMERS OF ALPHA-(N-AZIRIDINO) ALCOHOLS
Kwan C. Tsou, Huntingdon Valley, Pa., assignor to The Borden Company, New York, N.Y., a corporation of New Jersey
No Drawing. Filed July 29, 1960, Ser. No. 46,063
5 Claims. (Cl. 260—67.5)

This invention relates to alpha-(N-aziridino) alcohols and their polymers and to the processes for making them by reaction of an imine with an aldehyde.

In the embodiment which is at present preferred the monomer is that made by the reaction of ethylene imine with formaldehyde, thus

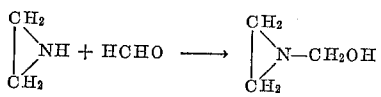

When more than a mole of the aldehyde is used, then the alcohol group —CH$_2$OH is expanded. With excess of formaldehyde, for example, the alpha monomer then becomes

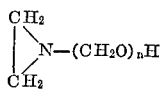

$n$ being an integral number within the range 1–15 and ordinarily 1–5. This formula, written in greater detail to show the representative N-alpha-C linkage in the polymeric form of the product, becomes

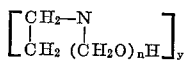

in which $y$ is an integer that for the monomer is 1 and for the polymer is within the approximate range 2–100.

With other imines and other aldehydes, the general formula for the monomeric unit recurring $y$ times in the polymer becomes

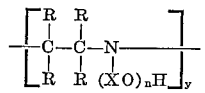

in which the various R's represents components selected from the group consisting of hydrogen and alkyls having therein 1–4 carbon atoms. This means that the several R's may represent the same or different ones of these monovalent components. X is a bivalent hydrocarbon group, i.e., XO is an aldehyde residue, containing 1–5 carbon atoms. The product is an alcohol. The N is joined in all cases to an alpha carbon, that is, the carbon originally in the aldehyde group —CHO, as in the alpha-(N-aziridino) ethanol

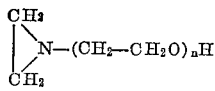

The imine selected should be a liquid so that the selected aldehyde if solid may be suspended without the use of additional solvent. Imines that meet the requirement for the imine and that illustrate the class to be used as ethylenimine; 2-methyl, 3-methyl, 2,3-dimethylethylenimine; and the corresponding ethylmethyl and butyl substitution products of ethylenimine.

As to the aldehyde to be reacted with the imine, I use substantially anhydrous paraformaldehyde or furfural. The reaction of the imine with the aldehyde is catalyzed by alkali. The imine itself provides, however, adequate alkalinity for the reaction. If a faster reaction is desired, as may be the case when a dilute solution of the imine in a solvent is employed, then I may add an additional alkali such as one of the alkali metal alkalies, as for instance, sodium and potassium carbonate or hydroxide, the hydroxides when used being in very small proportion.

When it is desired to wash the reaction product or a polymer thereof for purification purposes, I use a chemically inert liquid solvent for such impurities that are non-solvents for the said monomer or polymers thereof. Examples of such solvents that I may use in the purification are diethyl ether, tetrahydrofuran, dioxane and dimethyl formamide.

As to proportions there is required theoretically a minimum of one mole of the aldehyde to one mole of the imine. A smaller proportion of the aldehyde may be used, however, so as to leave some unreacted imine in the finished product. I may use as little as 0.5 mole and up to 3–5 moles of the aldehyde for 1 mole of the imine.

As to conditions, the reaction of the imine with the aldehyde is effected at a pH above 7.5, as within the range about 7.5–13, suitably the pH produced by the reaction of the imine with 1–4 moles of the selected aldehyde. If extraneous alkali is to be introduced, it is suitably sodium or potassium hydroxide or carbonate.

The monomer so produced is polymerized rapidly by any acid such as hydrochloric, sulfuric, or phosphoric, admixed in amount to establish a pH below 7 and thus initiate the evolution of heat or, without the addition of any acid and at a pH above 7, slowly at ordinary temperatures or less slowly by warming to a temperature not above about 225° C., as to 50°–150° C.

The reaction that ensues between the imine and the aldehyde is exothermic and cooling is used to moderate the reaction except when the reactants are thinned by the use of a diluting solvent such as one of those referred to above, as in the proportion of about 1–20 parts of the solvent for 1 of the imine used.

The invention will be further illustrated by description in connection with the following specific examples. Here and elsewhere herein proportions are expressed as parts by weight unless specifically stated to the contrary.

*Example 1*

To 25 parts paraformaldehyde (equivalent to 0.83 mole of HCHO) suspended in 150 parts of anhydrous ether there was added a solution of 12.5 parts (0.3 mole) of ethylenimine in 40 parts of additional ether. The exothermic reaction that ensued caused the temperature to rise from 19° C. at the time of mixing to 30° C. After about half an hour the reaction was substantially completed as shown by a drop in the temperature from the maximum stated to approximately 25° C. To promote reaction of any unreacted components, the mixture was stirred overnight and then filtered. The insoluble residue contained the desired reaction product of the aldehyde with the imine, i.e., alpha-(N)-aziridinomethanol. This was retained on the filter and was washed with approximately 40 parts of the anhydrous ether and then dried. The dry weight was 11.4 parts.

This dried residue was then fractionally distilled, first at atmospheric pressure up to about 40° C., to remove the ether and any unreacted formaldehyde. The residue from this distillation was then distilled in vacuo. After a foreshot of a few drops up to a temperature of 34° C. at 5–12 mm. pressure, there came over 2.78 parts of the alpha-(N-aziridino) methanol boiling at 44° C. at 3 mm., to 36° C. at 0.1 mm. The undistilled material remaining in the flask then amounted to 9.72 parts and contained the polymer, a polymethylol compound that may be written

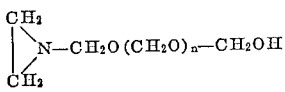

in which $n$ is a small number around 1 on the average.

This residue was allowed to stand overnight or longer. The resulting polymer was a transparent solid resinous mass.

*Example 2*

Into 15 parts of paraformaldehyde in 40 parts of anhydrous diethyl ether, there was admixed a solution of 25 parts of ethylenimine in 40 parts of the ether. The said solution was added slowly at a temperature of 22° C. The temperature rose to a maximum of 35.5° C. at the end of the addition.

Approximately 50 parts of ether were then boiled away and the remaining slurry was stirred overnight. Practically all solid material originally present disappeared. This shows the substantially complete utilization of the paraformaldehyde which, in the unreacted form, remained suspended in the other components.

The remaining solvent and any excess of ethylenimine was then evaporated at room temperature, under water aspiration. The residue was distilled at reduced pressure with the following results:

| Fraction No. | Boiling Point, ° C. at Pressure Shown | $n_d^{20}$ |
|---|---|---|
| 1 | 37°–40° at 16–15 mm | 1.4181 |
| 2 | 46°–53° at 10–4 mm | 1.4666 |

The 15 grams obtained after the initial forerun or fraction 1 is the monomer alpha-(N-aziridino) methanol. A small sample of this was redistilled for the determinaation of the infrared spectrum. The spectrum showed a very strong band at 3–3.5, i.e., hydroxyl group, but absence of the original NH group of the amine. There was a weak band for $CH_2$ at 6.75 mu indicating the group

This material was kept overnight at 10° C. Polymerization occurred to a transparent resinous solid that is soluble in methanol and also in water. On attempted distillation of this polymer, most of the mass distilled at a temperature of 46°–52° C. at a pressure of 1–0.8 mm., pressures herein and elsewhere herein being expressed as millimeters of mercury. In addition a small amount of material came over at the same pressure at a higher temperature, namely 83°–87° C. This second fraction, redistilled at 68°–68.5° C. and 0.05 mm. pressure had the following index of refraction $n_d^{20}$ —1.4905. It was the polymer of the alpha-(N-aziridino) methanol.

*Example 3*

The procedure of Example 1 is followed except that the imine there used is replaced in turn by an equimolecular proportion of any of the other imines disclosed herein.

*Example 4*

The procedures of Examples 1 and 2 are followed in turn except that the aldehyde there used is replaced by an equimolecular proportion of furfuraldehyde. The product finally made is alpha-(N-aziridinofurfuryl) alcohol.

*Example 5*

The procedure of Example 1 is followed except that the paraformaldehyde there used is decreased to 9 parts (equivalent to 0.3 mole HCHO). The product was when cold a pale lemon yellow transparent firm plastic.

The products made in monomeric form as described are useful in making the polymers. The polymers in turn are useful as water soluble cationic surfactants and in making water soluble packaging films by usual technique for shaping a water soluble resin into film form, as by extrusion or casting.

It will be understood that it is intended to cover all changes and modifications of the examples of the invention herein chosen for the purpose of illustration which do not constitute departures from the spirit and scope of the invention.

I claim:
1. In making a polymer, the process which comprises
   (a) forming an anhydrous mixture of an imine of the formula

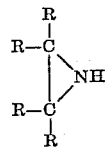

with an aldehyde selected from the group consisting of paraformaldehyde and furfural and
   (b) maintaining said imine and aldehyde in contact with each other and out of contact with water until polymerization is effected to a water soluble polymer of the formula

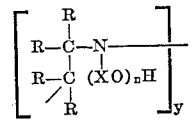

the R's in the formulas above representing monovalent components selected from the group consisting of hydrogen and alkyls having therein 1–4 carbon atoms each, $n$ and $y$ integers within the ranges 1–15 and 2–100, respectively, and X an alkylene group containing 1–5 carbon atoms.

2. The process of claim 1, said imine being ethylenimine and said aldehyde being paraformaldehyde.

3. The process of claim 1, the imine being ethylenimine and said aldehyde being furfural.

4. The process of claim 1, the proportions used being approximately 1 mole of the imine for 0.5–5 moles of formaldehyde represented in the paraformaldehyde.

5. The process of claim 4 including dissolving said mixture in anhydrous ether and distilling away the ether after said polymerizing is effected.

References Cited in the file of this patent
UNITED STATES PATENTS

| 2,272,489 | Ulrich | Feb. 10, 1942 |
| 2,296,225 | Ulrich | Sept. 15, 1942 |